(12) United States Patent
O'Reilly et al.

(10) Patent No.: US 12,100,919 B2
(45) Date of Patent: Sep. 24, 2024

(54) RECHARGEABLE USB ELECTRICAL OUTLET WITH INTEGRATED LIGHTING WITH CONNECTIVITY

(71) Applicant: O'Reilly Winship, LLC, Dallas, TX (US)

(72) Inventors: Michael O'Reilly, Dallas, TX (US); Donnye Winship, Dallas, TX (US)

(73) Assignee: O'Reilly Winship, LLC, Dallas, TX (US)

( * ) Notice: Subject to any disclaimer, the term of this patent is extended or adjusted under 35 U.S.C. 154(b) by 204 days.

(21) Appl. No.: 17/886,933

(22) Filed: Aug. 12, 2022

(65) Prior Publication Data

US 2022/0385003 A1 Dec. 1, 2022

Related U.S. Application Data

(63) Continuation-in-part of application No. 17/094,644, filed on Nov. 10, 2020, now Pat. No. 11,489,298, and
(Continued)

(51) Int. Cl.
*H02G 3/14* (2006.01)
*F21S 8/00* (2006.01)
(Continued)

(52) U.S. Cl.
CPC .......... *H01R 13/7175* (2013.01); *F21S 8/035* (2013.01); *F21S 9/022* (2013.01);
(Continued)

(58) Field of Classification Search
CPC ............ H02G 3/14; H02G 3/18; H02G 3/081; H05K 5/00; H05K 5/03; H01R 13/7175;
(Continued)

(56) References Cited

U.S. PATENT DOCUMENTS 3,739,226 A   6/1973 Seiter et al.
3,976,986 A   8/1976 Zabroski
(Continued)

FOREIGN PATENT DOCUMENTS

CN   202976729 U   6/2013
CN   204424649 U   6/2015
(Continued)

OTHER PUBLICATIONS

Search Report and Written Opinion for PCT Application No. PCT/US2021/058632 Dated Feb. 4, 2022.

*Primary Examiner* — Angel R Estrada
(74) *Attorney, Agent, or Firm* — James H. Ortega; David W. Carstens; Carstens, Allen & Gourley, LLP

(57) ABSTRACT

An electrical outlet device and system for providing light and power during the night or during a power failure. The device and system includes rechargeable energy storage devices that can be utilized to provide power to the outlet(s) and the light sources. The device and system can have two sections, a main and a removable section both having their own energy storage devices and light sources. The removeable section may connected with a computing device that can interface with a wireless module to transmit/receive data packets wirelessly.

20 Claims, 5 Drawing Sheets

Related U.S. Application Data a continuation-in-part of application No. 17/069,664, filed on Oct. 13, 2020, now Pat. No. 11,444,416, said application No. 17/094,644 is a continuation-in-part of application No. 16/834,803, filed on Mar. 30, 2020, now Pat. No. 10,833,460, said application No. 17/069,664 is a continuation of application No. 16/665,887, filed on Oct. 28, 2019, now Pat. No. 10,804,658, said application No. 16/834,803 is a continuation of application No. 16/381,822, filed on Apr. 11, 2019, now Pat. No. 10,644,465, said application No. 16/665,887 is a continuation of application No. 16/138,364, filed on Sep. 21, 2018, now Pat. No. 10,665,996, which is a continuation-in-part of application No. 15/984,005, filed on May 18, 2018, now Pat. No. 10,364,977, said application No. 16/381,822 is a continuation-in-part of application No. 15/984,005, filed on May 18, 2018, now Pat. No. 10,364,977.

(60) Provisional application No. 62/673,630, filed on May 18, 2018, provisional application No. 62/561,308, filed on Sep. 21, 2017.

(51) Int. Cl.

| | |
|---|---|
| *F21S 9/02* | (2006.01) |
| *H01R 13/70* | (2006.01) |
| *H01R 13/713* | (2006.01) |
| *H01R 13/717* | (2006.01) |
| *H01R 31/06* | (2006.01) |
| *H02J 7/00* | (2006.01) |
| *H05B 45/30* | (2020.01) |
| *F21Y 115/10* | (2016.01) |
| *H01R 24/68* | (2011.01) |
| *H01R 27/02* | (2006.01) |
| *H02J 7/34* | (2006.01) |
| *H05B 45/37* | (2020.01) |
| *H05B 45/395* | (2020.01) |

(52) U.S. Cl.
CPC ......... *H01R 13/701* (2013.01); *H01R 13/713* (2013.01); *H01R 31/065* (2013.01); *H02J 7/0042* (2013.01); *H02J 7/0045* (2013.01); *H02J 7/0068* (2013.01); *H05B 45/30* (2020.01); *F21Y 2115/10* (2016.08); *H01R 24/68* (2013.01); *H01R 27/02* (2013.01); *H02J 7/345* (2013.01); *H05B 45/37* (2020.01); *H05B 45/395* (2020.01)

(58) Field of Classification Search
CPC .... H01R 13/665; H01R 25/006; H01R 13/04; H01R 13/447; H01R 13/6683; H05B 33/0854; H01H 9/0264; H01H 21/04; H01H 9/0271; H01H 13/04; H02B 1/46; F21V 33/00; F21V 23/0442; F21S 8/033; F21S 9/022; G05F 3/02; F21Y 2115/10
USPC ............. 174/66, 67; 220/241, 242; 439/136, 439/143; 362/95
See application file for complete search history.

(56) References Cited

U.S. PATENT DOCUMENTS

| | | | |
|---|---|---|---|
| 4,410,835 A | 10/1983 | Zabroski | |
| 4,514,789 A | 4/1985 | Jester | |
| 5,485,356 A | 1/1996 | Nguyen | |
| 5,610,802 A | 3/1997 | Eidler et al. | |
| 5,683,166 A | 11/1997 | Lutzker | |
| 6,000,807 A | 12/1999 | Moreland | |
| 6,051,787 A | 4/2000 | Rintz | |
| 6,087,588 A | 7/2000 | Soules | |
| 6,200,159 B1 | 3/2001 | Chou | |
| 6,297,450 B1 | 10/2001 | Yu | |
| 6,423,900 B1 | 7/2002 | Soules | |
| 6,897,379 B1 | 5/2005 | Hsiao | |
| 7,270,436 B2 | 9/2007 | Jasper | |
| 7,442,090 B2 | 10/2008 | Mori et al. | |
| 7,549,785 B2 | 6/2009 | Faunce | |
| 7,581,844 B1 | 9/2009 | Yang | |
| 8,119,910 B1 | 2/2012 | Golden et al. | |
| 8,149,570 B2 | 4/2012 | Keebler et al. | |
| 8,158,883 B2 | 4/2012 | Soffer | |
| 8,668,347 B2 | 3/2014 | Ebeling | |
| 8,912,442 B2 | 12/2014 | Smith | |
| 9,035,180 B2 | 5/2015 | Smith et al. | |
| 9,035,181 B2 | 5/2015 | Smith et al. | |
| 9,362,728 B2 | 6/2016 | Smith et al. | |
| 9,482,426 B2 | 11/2016 | Diotte | |
| D781,241 S | 3/2017 | Knight | |
| 9,635,773 B1 | 4/2017 | Marshall | |
| 9,742,111 B2 | 8/2017 | Smith et al. | |
| 9,744,374 B1 | 8/2017 | Bower et al. | |
| 9,768,562 B2 | 9/2017 | Smith et al. | |
| 9,774,154 B2 | 9/2017 | Laurent et al. | |
| 9,787,025 B2 | 10/2017 | Smith et al. | |
| 9,807,829 B2 | 10/2017 | Jensen | |
| 9,832,841 B2 | 11/2017 | Knight et al. | |
| 9,871,324 B2 | 1/2018 | Smith et al. | |
| 9,882,318 B2 | 1/2018 | Smith et al. | |
| 9,882,361 B2 | 1/2018 | Smith et al. | |
| D809,899 S | 2/2018 | Knight et al. | |
| D810,697 S | 2/2018 | Smith | |
| 9,899,814 B2 | 2/2018 | Smith et al. | |
| 9,917,430 B2 | 3/2018 | Smith et al. | |
| D819,426 S | 6/2018 | Smith et al. | |
| 9,997,860 B1 | 6/2018 | Hernandez, Jr. | |
| D832,223 S | 10/2018 | Knight | |
| D832,224 S | 10/2018 | Knight et al. | |
| 10,109,945 B2 | 10/2018 | Smith et al. | |
| 10,364,977 B2 | 7/2019 | O'Reilly et al. | |
| 10,381,789 B2 | 8/2019 | Smith et al. | |
| 10,644,465 B2 | 5/2020 | O'Reilly et al. | |
| 10,665,996 B2 * | 5/2020 | O'Reilly .............. | H02J 7/0042 |
| 10,804,658 B2 | 10/2020 | O'Reilly et al. | |
| 11,489,298 B2 * | 11/2022 | O'Reilly .............. | H01H 9/0271 |
| 2003/0092297 A1 | 5/2003 | Reindle et al. | |
| 2004/0142601 A1 | 7/2004 | Luu | |
| 2005/0135103 A1 | 6/2005 | Evans | |
| 2006/0073731 A1 | 4/2006 | Chien | |
| 2012/0068612 A1 | 3/2012 | Ebeling | |
| 2013/0032594 A1 | 2/2013 | Smith | |
| 2016/0248202 A1 | 8/2016 | Smith et al. | |
| 2017/0222364 A1 | 8/2017 | Smith et al. | |
| 2018/0048099 A1 | 2/2018 | Diotte | |
| 2019/0020156 A1 | 1/2019 | Smith et al. | |
| 2019/0097834 A1 | 3/2019 | Dempsey | |
| 2019/0122832 A1 | 4/2019 | Smith | |
| 2020/0036141 A1 | 1/2020 | Smith et al. | |
| 2020/0242902 A1 | 7/2020 | Derickson | |
| 2020/0251861 A1 | 8/2020 | O'Reilly et al. | |
| 2020/0412070 A1 | 12/2020 | Owen et al. | |
| 2021/0057856 A1 | 2/2021 | O'Reilly et al. | |

FOREIGN PATENT DOCUMENTS

| | | |
|---|---|---|
| CN | 105490099 A | 4/2016 |
| DE | 10149860 A1 | 4/2003 |
| DE | 202014001980 U1 | 8/2014 |
| DE | 102014001371 A1 | 8/2015 |
| JP | H01204389 A | 8/1989 |
| JP | H05100624 A | 4/1993 |
| JP | H08102201 A | 4/1996 |
| JP | H08288073 A | 11/1996 |
| JP | 2011049100 A | 3/2011 |
| KR | 101022746 B1 | 3/2011 |
| WO | 2015078079 A1 | 6/2015 |

* cited by examiner

RECHARGEABLE USB ELECTRICAL OUTLET WITH INTEGRATED LIGHTING WITH CONNECTIVITY

CROSS-REFERENCE TO RELATED APPLICATIONS

This application is a continuation in part of U.S. Non-provisional application Ser. No. 17/069,664, filed Oct. 13, 2020, which is a continuation of U.S. Non-Provisional application Ser. No. 16/665,887, filed Oct. 28, 2019, now U.S. Pat. No. 10,804,658, which is a continuation application of U.S. Non-Provisional application Ser. No. 16/138,364, filed Sep. 21, 2018, now U.S. Pat. No. 10,665,996, which is a continuation-in-part of U.S. Non-Provisional application Ser. No. 15/984,005, filed May 18, 2018, now U.S. Pat. No. 10,364,977, which claims the benefit of U.S. Provisional Application No. 62/561,308, filed Sep. 21, 2017, the disclosure of which is incorporated herein by reference.

This application is a continuation in part of U.S. Non-Provisional application Ser. No. 17/069,664, filed Oct. 13, 2020, which is a continuation application of U.S. Non-Provisional application Ser. No. 16/665,887, filed Oct. 28, 2019, now U.S. Pat. No. 10,804,658, which is a continuation application of U.S. Non-Provisional application Ser. No. 16/138,364, filed Sep. 21, 2018, now U.S. Pat. No. 10,665,996, which claims the benefit of U.S. Provisional Application No. 62/673,630, filed May 18, 2018, the disclosure of which is incorporated herein by reference.

This application is a continuation in part of U.S. Non-Provisional application Ser. No. 17/094,644, filed Nov. 10, 2020, which is a continuation in part of U.S. Non-provisional application Ser. No. 16/834,803, filed Mar. 30, 2020, now U.S. Pat. No. 10,833,460, which is a continuation of U.S. Non-Provisional application Ser. No. 16/381,822, filed Apr. 11, 2019, now U.S. Pat. No. 10,644,465, which is a continuation in part of U.S. Non-Provisional application Ser. No. 15/984,005, filed May 18, 2018, now U.S. Pat. No. 10,364,977, which claims the benefit of U.S. Provisional Application No. 62/561,308, filed Sep. 21, 2017, the disclosure of which is incorporated herein by reference.

TECHNICAL FIELD

The present disclosure relates to a light emitting electrical outlet. More particularly, and not by way of limitation, the present disclosure is directed to a system and apparatus for a light emitting electrical outlet with a removable light source, USB outlets, and connectivity.

BACKGROUND

Electrical outlets are a necessary part of everyday life for a majority of people throughout the world. However, there are two major drawbacks with traditional electrical outlets. First, they do not operate without a power source, and second, they are often placed in locations that are either not lighted well or completely devoid of any light source requiring lamps or flashlights in order to plug any device into them.

Additionally, electrical outlets are often taken up by night-lights, especially in the rooms of small children. While, night-lights, and emergency lighting devices have been around for many years, each have their own individual downfalls. Night-lights in particular often require at least one electrical outlet or socket to be used, while in some cases both outlets are used by the night-light. These lights also can become very hot, and if other items in a room such as a child's blanket or stuffed animal comes in contact with the night-light for an extended period then a fire hazard, or even an actual fire can result. For emergency lighting, there is typically no manner of operation that allows the light to be utilized in anything other than in an emergency. Additionally, these lights typically use at least one if not both outlets of a traditional electrical plug outlet or socket.

One of the additional downfalls these devices is there is no manner or means for dual operation for a night-light and emergency lighting. In many cases, a night light cannot operate as an emergency light due a requirement that they be plugged into an outlet or socket that cannot provide power during a power outage. Many night-lights also do not include light detectors or photovoltaic cell to determine when daylight or other lights sources are sufficient to turn off and/or allow the night-light to cool. Conversely, emergency lights are not conducive to use as night lights because emergency lights require large batteries or other energy source that can be utilized in the event of a power failure to produce a strong or high intensity light, along with circuitry to detect when a power failure occurs. These emergency lights are also often connected together to the battery backup system for an entire building but cannot provide lighting to pathways or in rooms that are not connected to the battery backup system.

In addition, it may be useful for the emergency lights to communicate with each other and other entities via a connection so that emergency lights may be engaged from a location at a specified distance from the source of the emergency. For instance, a fire in one room of a commercial building may necessitate the need for all emergency lighting in a building, including emergency lights featured in a electrical outlet, to be turned on to assist in the navigation of the occupants in the building.

It would be advantageous to have an apparatus, and system for an electrical outlet faceplate with integrated lighting that overcomes the disadvantages of the prior art. The present disclosure provides such an apparatus, and system.

BRIEF SUMMARY

The present disclosure is directed to a lighting device. The lighting device may be utilized throughout home, businesses, storage areas, and anywhere where electrical power can be provided. The lighting device may receive an electrical power signal from electrical power source. Thus, in one aspect, the present disclosure is directed to a lighting device incorporated within an electrical outlet or socket faceplate. The lighting device can receive electrical power from an electrical outlet via the contact points of the plug, outlet and/or switch.

In another aspect, the present disclosure is directed to a night-light device incorporated within an electrical outlet or socket. To provide a small amount of light for those such as, small children or those that have to get up during the night. In yet another aspect, the present disclosure is directed to an emergency light for use during a power failure. When a power failure occurs the lighting device may active its light source to provide light to the area and environment it has been placed.

In another aspect, the present disclosure is directed to a communications module incorporated within an electrical outlet or socket cover. The communications module may be enabled to communicate with a transmitter and/or receiver such as, but not limited to, a base station, a user, one or more electoral outlets or socket covers within the system, in a second system, and/or an entity outside the system, through a communication means such as a network. This communication means may be conducted wirelessly with a wireless module incorporated within at least one electrical outlet or socket cover.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
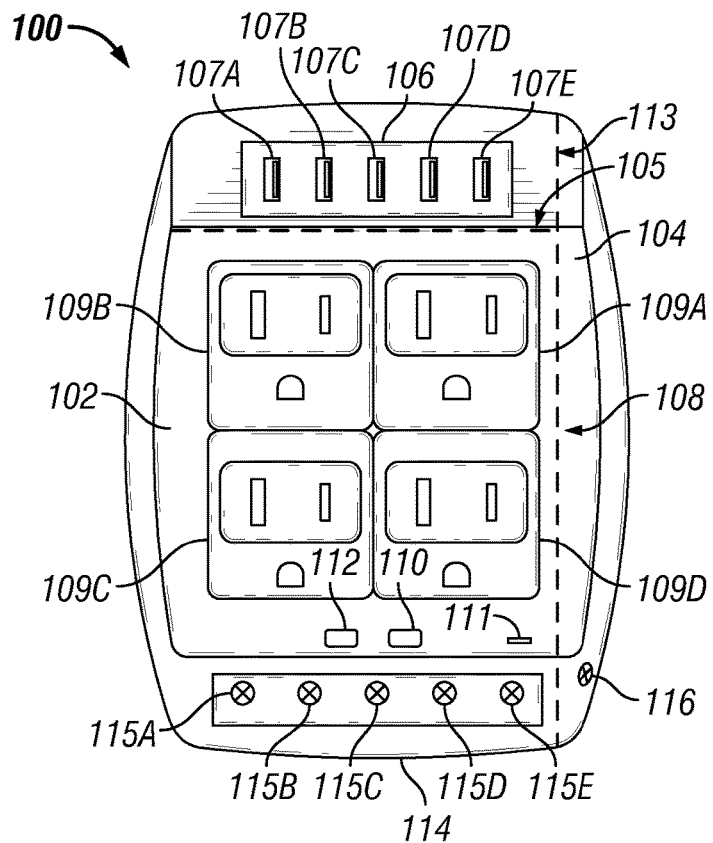
FIG. 1 is a front view illustration of an electric outlet device.

An embodiment of the disclosure will now be described. FIG. 1 is a front view illustration of an electric outlet device 100. The electric outlet device 100 is comprised of a first section 102, and a second section 104. In at least one version, the first section 102 can be a main section and the second section 104 can be a removable section. The first section 102 and the second section 104 may be coupled or fastened together through any number of fasteners and/or couplers, such as, but not limited to, screws, nails, clips, adhesives, glues, synthetic materials, dovetail, tongue and groove, post and hole, snaps or a snap like connections, or any other attachment means or method, or any combination thereof. In at least one embodiment of the present disclosure, the second section 104 can be an at least one removable sections each of the at least one removable section having their own light source (not illustrated) and energy storage device (not illustrated). In another embodiment, the first section 102 may comprise an enclosure for housing the second section 104 or a removable section of the enclosure at the coupling point 113.

The first section 102 can also include a front surface upon which, a USB outlet section 106, a plug section 108, a sensor 110, an indicator 112, and/or a light source 114 may be housed within, affixed to, or upon. The USB outlet section 106 may in at least one embodiment be removably coupled at the coupling point 105 the first section 102 with a power source (not illustrated) that can be removably coupled to the first section and/or a first section power source (not illustrated).

The USB outlet section 106 is comprised of at least one USB outlet 107A/107B/107C/107D/107E (collectively 107). The at least one USB outlet 107 can be coupled to at least one power source (not illustrated) such as, but not limited to, an AC or DC voltage. The USB outlet section 106 can have at least one of the USB outlet(s) 107 coupled to an internal power source, and/or an external power source (not illustrated). In at least one embodiment, the internal power source can be coupled to the external power source for charging.

The plug section 108 is comprised of at least one electrical plug 109A/109B/109C/109D (collectively 109). The at least one electrical plug 109 allows for an electrical device (not illustrated) to be plugged into or together with the electric outlet device 100 and receive power and/or energy. In at least one version, the at least one electrical plug 109 is a female electrical plug.

The sensor 110 is a photocell that can include, but is not limited to a photo resistor, a phototransistor, and/or a photodiode for detecting and/or measuring the amount of light, ambient light, or other environmental conditions in a local environment. In at least one embodiment, the sensor 110 may also include at least one sensor or other environmental sensors such as, but not limited to, humidity, temperature, air quality, carbon dioxide, carbon monoxide, nitrogen dioxide, vibration, accelerometer, microphones, sound detection, gas sensors, pressure sensors, tilt sensors, weather, and/or other sensors that may include or provide a signal, control signal, or indication of an environmental event or environmental condition. The sensor 110 can allow the circuitry of the electric outlet device 100 to respond to environmental conditions that can trigger changes in the behavior of the electric outlet device 100. The circuitry (not illustrated) may couple and/or decouple internal power sources from external power sources (not illustrated) based on the sensor(s) 110. For example, the sensor(s) 110 may indicate that that a light level has decreased in a room causing a light emitting device to be activated and/or coupled to a battery or other internal power source.

A sound emitter 111 may also be housed within the main section 102, or have an aperture, housing, and/or void defined by the main section 102. The sound emitter 111 can be coupled to the control circuit (not illustrated) and allow for a sound to be emitted continuously or intermittently from the electric outlet device 100 for a specified amount of time, such as but not limited to, 10 seconds, 15 seconds, 30 seconds, 1 minute, 3 minutes, 5 minutes, 10 minutes, 15 minutes, and/or 30 minutes after a power failure has occurred and the power has not been restored. For example, the sensor(s) 110 can include a carbon monoxide sensor that is activated due to an increasing amount of carbon monoxide in a room can then trigger the sound emitter 111 to alert any people within the room.

The indicator 112, in at least one version, can be at least one Light Emitting Diode (LED), or other light emitting device, such as but not limited to, a light bulb, incandescent bulb, halogen bulb, and/or fluorescent bulb. In at least one embodiment, the indicator 112 may also include, a visual display such, but not limited to, a Liquid Crystal Display (LCD), LED display, or other display devices. The indicator 112 may be utilized to indicate when an external power source is providing power to the electric outlet device 100 and/or when a power outage has occurred. The light source 114 is at least one Light Emitting Diode (LED) 115A/115B/115C/115D/115E, or other light emitting device, such as but not limited to, a light bulb, incandescent bulb, halogen bulb, and/or fluorescent bulb. The light source 114 may be activated based on the sensor(s) 110 and/or other circuitry, such as, but not limited to, a power detection circuit and/or coupling detection circuit. For example, the light source 114 can be deactivated when the second section 104 is removed from the first section 102, or activated when there is no power detected by a power detection circuit.

The second section 104 can include an indicator 116, and connectors (not illustrated) that can allow a coupling detection circuit to know when the second section 104 is removed from the first section 102. The indicator 116 is at least one Light Emitting Diode (LED), or other light emitting device, such as but not limited to, a light bulb, incandescent bulb, halogen bulb, and/or fluorescent bulb. In one embodiment, the indicator 116 may also include, a visual display such, but not limited to, a Liquid Crystal Display (LCD), LED display, or other display devices.

Figure 2:
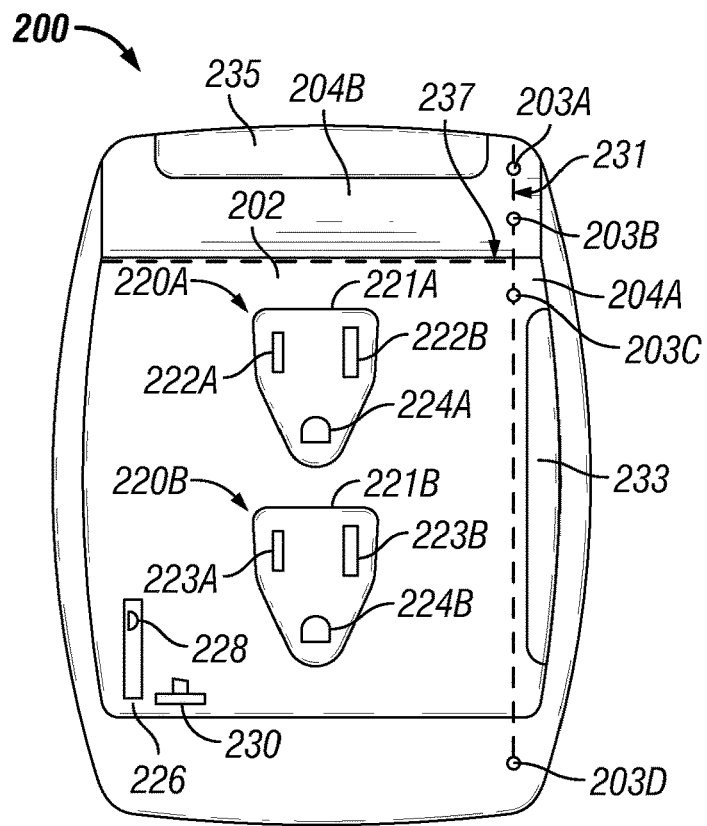
FIG. 2 is a rear view illustration of an electric outlet device.

FIG. 2 is a rear view illustration of an electric outlet device 200. The electric outlet device 200 can include a first section 202 and a second section 204. The first section 202 and the second section 204 may be coupled or fastened together through any number of fasteners and/or couplers 203A/203B/203C/203D (collectively 203), such as, but not limited to, magnets, screws, nails, clips, adhesives, glues, synthetic materials, dovetail, tongue and groove, post and hole, snaps or a snap like connection, or any other attachment means or method, or any combination thereof that may also allow for an electrical coupling.

The first section 202 may also include a first plug section 220A, a second plug section 220B, a dimming switch 226, and/or a switch 230. In at least one embodiment, the second section 204 can include a first removable section 204A and a second removable section 204B (collectively 204). The removable section(s) or second section 204, can also include a void 233 or 235 defined by removable section 204 that would allow and/or assist a user in removing the second section 204. The first removable section 204A and the second removable section 204B can be separated from the first section 202 at the respective separation points 231, and 237. The first plug section 220A can include a first plug structure 221A, a first conductor 222A, a second conductor 222B, and/or a grounding conductor 224A. The first plug structure 221A can provide an offset and/or platform for the first plug section 220A to compensate for dimming switch 226, slider 228, and/or switch 230. The first conductor 222A, the second conductor 222B, and/or the grounding conductor 224A are blade type conductors. In alternative embodiments, the first conductor 222A, the second conductor 222B, and/or the grounding conductor 224A are pole type conductors, or a combination of blade and pole type conductors. In at least one version, the first and/or second plug structure 221A/221B is a male electrical plug. In other versions, the switch 230 can be a first switch, and the dimming switch 226 can be a second switch. For example, the plug section(s) 220 can be coupled to an electric outlet to allow for a coupling to an external power source such as, but not limited to, an AC or DC power source.

The second plug section 220B can include a second plug structure 221B, a first conductor 223A, a second conductor 223B, and/or a grounding conductor 224B. The second plug structure 221B can provide an offset and/or platform for the second plug section 220B to compensate for dimming switch 226, slider 228, and/or switch 230. The first conductor 223A, the second conductor 223B, and/or the grounding conductor 224B are blade type conductors. In alternative embodiments, the first conductor 223A, the second conductor 223B, and/or the grounding conductor 224B are pole type conductors, or a combination of blade and pole type conductors.

The dimming switch 226 may include a slider 228. In alternative embodiments, the dimming switch 226 can include a rotary dial, a multi-position switch, and/or a dip (dual in-line package) switch configuration. The switch 230, in at least one version, is a dip switch. In alternative versions, the switch 230 may also be a rotary dial, a multi-position switch, and/or a slider switch configuration. For example, if a light source (not illustrated) is utilized for a night light a user may desire the light source to be dimmed from its maximum light output to say 75 percent, 50 percent, or even more preferably 25% of the maximum light output. However, when utilized in an emergency lighting scenario the maximum output would likely be utilized.

Figure 3:
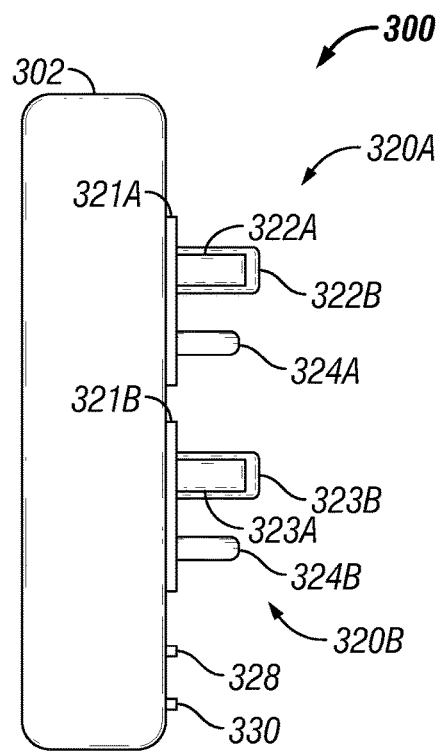
FIG. 3 is a side view illustration of an electric outlet device.

FIG. 3 is a side view illustration of an electric outlet device 300. The electric outlet device 300 can include a main section 302, and at least one a removable section (not illustrated). The main section 302 can be further comprised of a first plug section 320A, a second plug section 320B, a slider 328, and/or a switch 330.

The first plug section 320A can include a first plug structure 321A, a first conductor 322A, a second conductor 322B, and/or a grounding conductor 324A. The first plug structure 321A can provide an offset and/or platform for the first plug section 320A to compensate for the depth of the slider 328, and/or switch 330. The first conductor 322A, the second conductor 322B, and/or the grounding conductor 324A are blade type conductors. In alternative examples, the first conductor 322A, the second conductor 322B, and/or the grounding conductor 324A are pole type conductors, or a combination of blade and pole type conductors.

The second plug section 320B can include a second plug structure 321B, a first conductor 323A, a second conductor 323B, and/or a grounding conductor 324B. The second plug structure 321B can provide an offset and/or platform for the second plug section 320B to compensate for the depth of the dimming switch (not illustrated), slider 328, and/or switch 330. The first conductor 323A, the second conductor 323B, and/or the grounding conductor 324B are blade type conductors. In alternative examples, the first conductor 323A, the second conductor 323B, and/or the grounding conductor 324B are pole type conductors, or a combination of blade and pole type conductors.

The dimming switch (not illustrated) can also include a slider 328. In alternative versions, the dimming switch (not illustrated) may include a rotary dial, a multi-position switch, and/or a dip (dual in-line package) switch configuration. The switch 330, in at least one version, is a dipswitch. In alternative versions, the switch 330 may also be a rotary dial, a multi-position switch, and/or a slider switch configuration.

Figure 4:
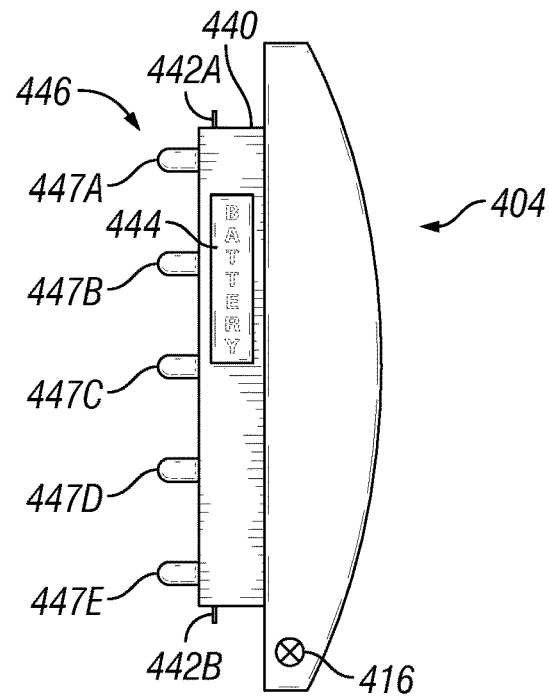
FIG. 4 is a side view illustration of a removable section of the electric outlet device.

FIG. 4 is a side view illustration of a removable section 404 of the electric outlet device (not illustrated). The removable section 404 can include an indicator 416, a storage section 440, a first connector 442A, a second connector 442B, and/or a light source 446.

The indicator 416, in at least one version, is at least one Light Emitting Diode (LED), or other light emitting device, such as but not limited to, a light bulb, incandescent bulb, halogen bulb, and/or fluorescent bulb. In one example, the indicator 416 may also include, a visual display such, but not limited to, a Liquid Crystal Display (LCD), LED display, or other display devices.

The storage section 440 can be sized to provide storage for at least one energy storage device 444. The at least one energy storage device 444 can include, but is not limited to a battery, a coin battery, a high capacity battery, a super capacitor, a fuel cell, hybrid capacitor battery or other energy storage device. In one example, the at least one energy storage device is charged when the removable section 404 of the electric outlet device is coupled and/or secured within the main section (not illustrated). The storage section 440 may also have a first connector 442A, and/or a second connector 442B that allow the at least one energy storage device 444, to be electrically coupled with a power source (not illustrated).

The at least one energy storage device 444 can be coupled to a light source 446. The light source 446 can include at least one light emitting device 447A/447B/447C/447D/447E (collectively 447). In alternative versions, each of the at least one light emitting device(s) 447 may have its own energy storage device. The at least one light emitting device can be, but is not limited to, a Light Emitting Diode (LED), or other light emitting device, such as but not limited to, a light bulb, incandescent bulb, halogen bulb, and/or fluorescent bulb.

Figure 5:
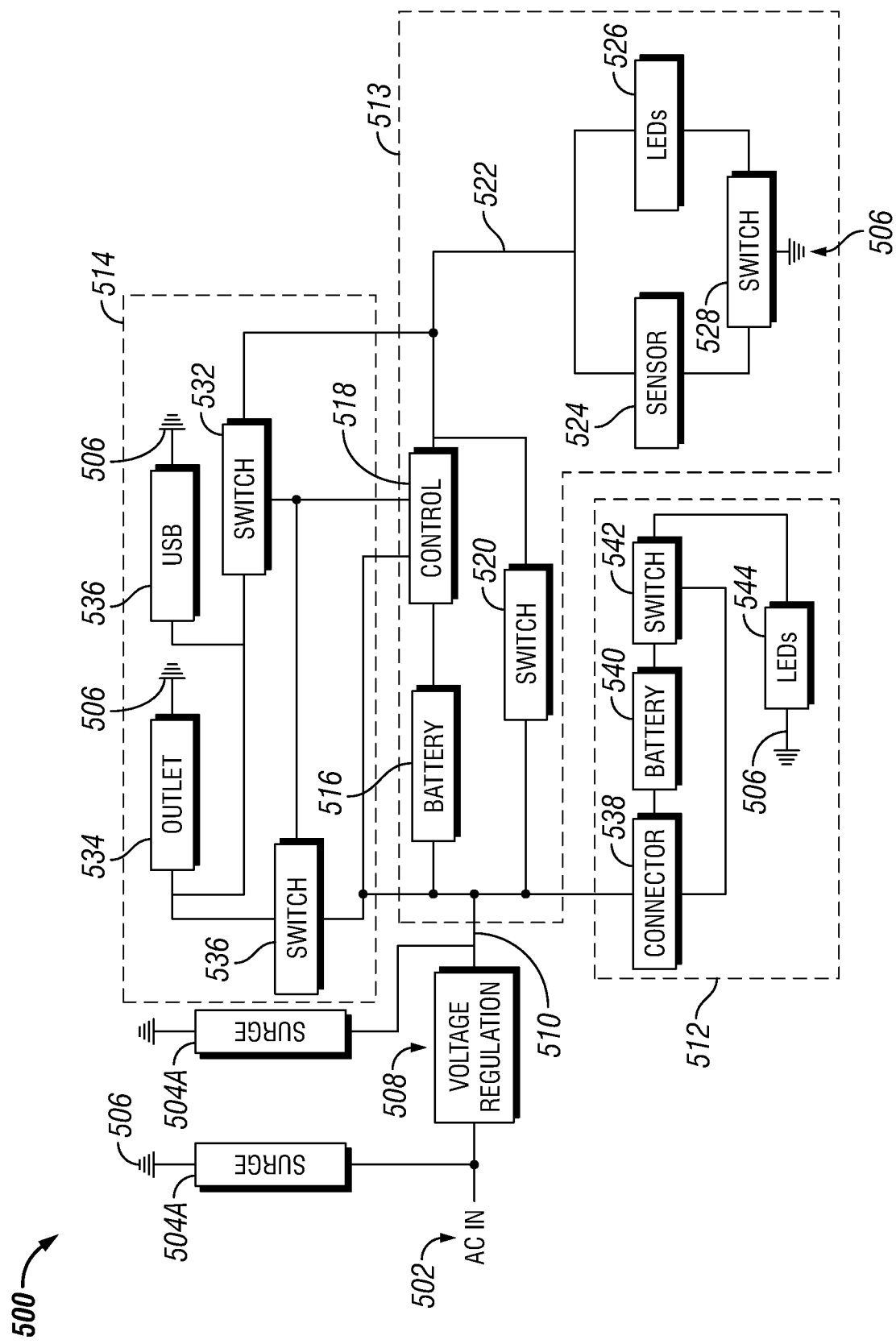
FIG. 5 is a schematic illustration of an electric outlet system.

FIG. 5 is a schematic illustration of an electric outlet system 500. The electric outlet system 500 can include a power input 502, surge protection 504 (collective of surge protector 504A, and/or surge protector 504B), voltage regulation circuit 508, a removable section 512, a plug section 514, and/or a night light and power outage section 513.

In at least one version, the power input 502 is coupled to a surge protector 504A, a voltage regulation circuit 508, and/or a surge protector 504B. The surge protectors 504A/504B can be coupled to the power source directly or indirectly, to prevent power spikes or surges that could damage other circuit elements coupled to the power input 502 and/or voltage regulation circuit 508. In one example, the surge protectors 504A/504B may also include at least one circuit breaker. The voltage regulation circuit 508 may be utilized to condition and/or convert the voltage from an AC-to-DC voltage, and/or step up or down the voltage. The output of the voltage regulation circuit 508 may be a regulated voltage 510, this regulated voltage 510 can be coupled to the removable section 512, the nightlight and power outage section 513, and/or the plug section 514.

In at least one version, the removable section 512 is coupled to the regulated voltage by a connector 538. The connector can be coupled to at least one energy storage device 540 and a switch 542. The at least one storage energy device 540 can include, but is not limited to a battery, a coin battery, or a high capacity battery. The switch 542 can be activated and/or deactivated based on the stated of the connector 538. For example, when the switch 542 is activated and/or closed then the at least one energy storage device is coupled to a light source 544. The light source 544 can include, but is not limited to, a Light Emitting Diode (LED), or other light emitting device, such as but not limited to, a light bulb, incandescent bulb, halogen bulb, and/or fluorescent bulb. The removable section 512 may also include a coupling detection circuit that can detect when the removable section 512 is removed from the first section (not illustrated). The coupling detection circuit may be activated when the connector 538 is disconnected from other circuits and/or from the first section or main body (not illustrated). When the circuit detection circuit can then activate other circuit elements, such as, but not limited to, LED(s), switches, power sources, and/or other elements or circuits.

In at least one version, the nightlight and power outage section 513 includes at least one energy storage device 516, a control circuit 518, a switch 520, a sensor 524, at least one light source 526, and/or a switch 528. The at least one energy storage device 516 can be bypassed with the switch 520 to allow the night light mode to be activated. For example, when the switch 520 is closed, then the at least one energy storage device 516 is coupled through the control circuit 518 to the sensor 524 and/or at least one light source 526. A control or bypass voltage 522 may be the output of the control circuit 518 and/or the switch 520 based on the chosen at least one operational mode of the electric outlet system 500. The control or bypass voltage 522 may be provided to the sensor 524, and/or the at least one light source 526. In at least one version, the sensor 524, is coupled to a switch 528 that can coupled the at least one light source 526 to ground 506, and/or allow the at least one light source 526 to float. The sensor 524 in one example is a photocell that can include, but is not limited to a photo resistor, a phototransistor, and/or a photodiode. In other examples, the sensor 524 may also include at least one sensor or other environmental sensors such as, but not limited to, humidity, temperature, air quality, carbon dioxide, carbon monoxide, nitrogen dioxide, vibration, accelerometer, microphones, sound detection, gas sensors, pressure sensors, tilt sensors, weather, and/or other sensors that may include or provide a signal or indication of an environmental event.

In at least one version, the plug section 514 can include a switch 530, a switch 532, at least one plug 534, and/or at least one USB outlet 536. In one example, the switches 530/532 are transistors, or other controllable circuit element capable of switching between at least two states. For example, the switches 530/532 allow for the at least one energy storage device 516 to be coupled to the at least one plug 534, and/or the at least one USB outlet 536 when the control circuit 518 indicates a power failure has occurred, and/or triggers a change of state for the switches 530/532.

In at least one version, the at least one plug 534 can be coupled to the regulated voltage alternatively it can be coupled to the power input 502 in alternative embodiments. The at least one plug 534 may include of at least one female plug. The at least one USB outlet 536 may be include of at least one female USB outlet. The at least one plug, and/or the at least one USB outlet can allow a user to couple electrical devices, such as but not limited to, lamps, computers, tablets, and/or phones (not illustrated) to the electrical outlet system 500. For example, when the at least one plug 534 is not electrically coupled to a power source (such as 502), the internal or battery power sources can be activated to provide power to the light source(s), plug(s), and/or USB outlet(s).

In at least one version, the main body can include a light source or first light source, and the removable section can include a light source or second light source. In other versions, the removable section may include a USB removable section including the USB plugs and at least one energy storage device, and/or a removable light section including a light source and at least one energy storage device. In still other versions, the light source(s) may be coupled to the control circuit to allow for a night light operational mode and/or an emergency lighting operational mode.

While the disclosure is discussed as an electric outlet device, some alternative embodiments can include outlet or switch faceplates, breaker boxes, battery backup systems, lamps, speakers, portable speakers, modems, control boxes, network access points, alarm boxes, circuit boxes, and/or other devices or systems. For example, a circuit breaker box could include a nightlight and power outage section, or power detection section that could then be utilized to activate a light source within and/or on the circuit breaker box when a power outage has occurred. A removable light source could also be include that can be removed from the circuit breaker box to allow a user to replace a bad circuit breaker and/or work on the circuit breaker box. Other examples, could include the power detection circuit and/or removable section to allow for a light source to be utilized by a user.

Figure 6:
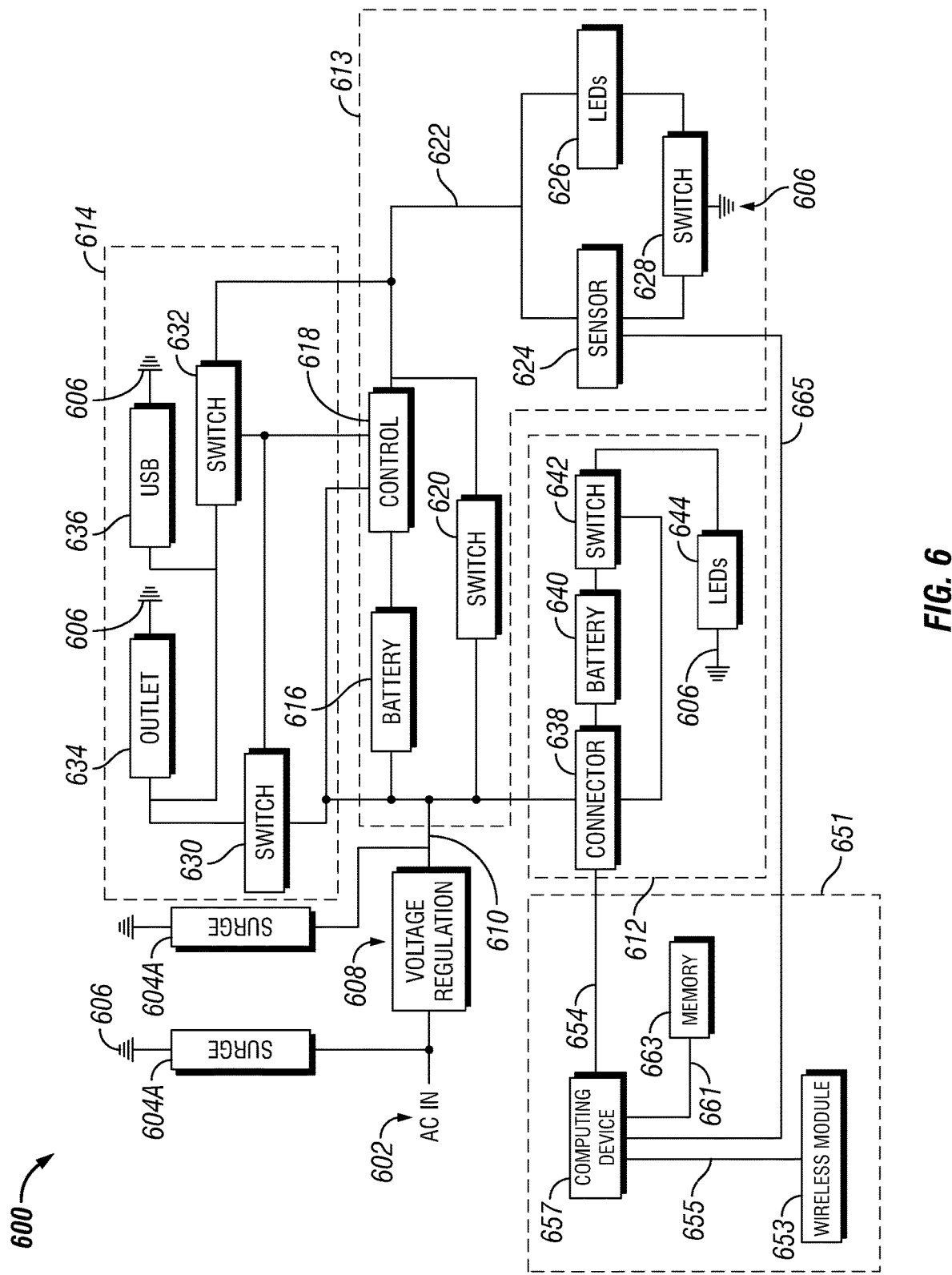
FIG. 6 is an illustration of a block diagram view of an electrical outlet device with a removable section configured with connectivity and with lighting on both sections.

FIG. 6 is an illustration of a block diagram view of an electrical outlet device 600 with removable section configured with connectivity and with lighting on both sections. The electrical outlet device 600 can include portions of the electrical outlet apparatus, and/or systems described in the figures above, and without limitation to those described in connection with FIGS. 1-5. In some examples, the electric outlet device 600 can include a power input 602, surge protection 604 (collective of surge protector 604A, and/or surge protector 604B), voltage regulation circuit 608, a removable section 612, a plug section 614, and/or a night light and power outage section 613.

In at least one version, the power input 602 is coupled to a surge protector 604A, a voltage regulation circuit 608, and/or a surge protector 604B. The surge protectors 604A/604B can be coupled to the power source directly or indirectly, to prevent power spikes or surges that could damage other circuit elements coupled to the power input 602 and/or voltage regulation circuit 608. In one example, the surge protectors 604A/604B may also include at least one circuit breaker. The voltage regulation circuit 608 may be utilized to condition and/or convert the voltage from an AC-to-DC voltage, and/or step up or down the voltage. The output of the voltage regulation circuit 608 may be a regulated voltage 610, this regulated voltage 610 can be coupled to the removable section 612, the nightlight and power outage section 613, and/or the plug section 614.

In at least one version, the removable section 612 is coupled to the regulated voltage by a connector 638. The connector can be coupled to at least one energy storage device 640 and a switch 642. The at least one storage energy device 640 can include, but is not limited to a battery, a coin battery, or a high capacity battery. The switch 642 can be activated and/or deactivated based on the stated of the connector 638. For example, when the switch 642 is activated and/or closed then the at least one energy storage device is coupled to a light source 644. The light source 644 can include, but is not limited to, a Light Emitting Diode (LED), or other light emitting device, such as but not limited to, a light bulb, incandescent bulb, halogen bulb, and/or fluorescent bulb. The removable section 612 may also include a coupling detection circuit that can detect when the removable section 612 is removed from the first section (not illustrated). The coupling detection circuit may be activated when the connector 638 is disconnected from other circuits and/or from the first section or main body (not illustrated). When activated, the coupling detection circuit can then activate other circuit elements, such as, but not limited to, LED(s), switches, power sources, and/or other elements or circuits.

In at least one version, the nightlight and power outage section 613 includes at least one energy storage device 616, a control circuit 618, a switch 620, a sensor 624, at least one light source 626, and/or a switch 628. The at least one energy storage device 616 can be bypassed with the switch 620 to allow the night light mode to be activated. For example, when the switch 620 is closed, then the at least one energy storage device 616 is coupled through the control circuit 618 to the sensor 624 and/or at least one light source 626. A control or bypass voltage 622 may be the output of the control circuit 618 and/or the switch 620 based on the chosen at least one operational mode of the electric outlet device 600. The control or bypass voltage 622 may be provided to the sensor 624, and/or the at least one light source 626. In at least one version, the sensor 624, is coupled to a switch 628 that can couple the at least one light source 626 to ground 606, and/or allow the at least one light source 626 to float. The sensor 624 in one example is a photocell that can include, but is not limited to a photo resistor, a phototransistor, and/or a photodiode. In other examples, the sensor 624 may also include at least one sensor or other environmental sensors such as, but not limited to, humidity, temperature, air quality, carbon dioxide, carbon monoxide, nitrogen dioxide, vibration, accelerometer, microphones, sound detection, gas sensors, pressure sensors, tilt sensors, weather, and/or other sensors that may include or provide a signal or indication of an environmental event.

In at least one version, the plug section 614 can include a switch 630, a switch 632, at least one plug 634, and/or at least one USB outlet 636. In one example, the switches 630 and/or 632 are transistors, or other controllable circuit element capable of switching between at least two states. For example, the switches 630 and/or 632 allow for the at least one energy storage device 616 to be coupled to the at least one plug 634, and/or the at least one USB outlet 636 when the control circuit 618 indicates a power failure has occurred, and/or triggers a change of state for the switches 630 and/or 632.

In at least one version, the at least one plug 634 can be coupled to the regulated voltage alternatively it can be coupled to the power input 602 in alternative embodiments. The at least one plug 634 may include of at least one female plug. The at least one USB outlet 636 may be include of at least one female USB outlet. The at least one plug, and/or the at least one USB outlet can allow a user to couple electrical devices, such as but not limited to, lamps, computers, tablets, and/or phones (not illustrated) to the electrical outlet device 600. For example, when the at least one plug 634 is not electrically coupled to a power source (such as 602), the internal or battery power sources can be activated to provide power to the light source(s), plug(s), and/or USB outlet(s).

In at least one version, the main body can include a light source or first light source, and the removable section can include a light source or second light source. In other versions, the removable section may include a USB removable section including the USB plugs and at least one energy storage device, and/or a removable light section including a light source and at least one energy storage device. In still other versions, the light source(s) may be coupled to the control circuit to allow for a night light operational mode and/or an emergency lighting operational mode.

While the disclosure is discussed as an electric outlet device, some alternative embodiments can include outlet or switch faceplates, breaker boxes, battery backup systems, lamps, speakers, portable speakers, modems, control boxes, network access points, alarm boxes, circuit boxes, and/or other devices or systems. For example, a circuit breaker box could include a nightlight and power outage section, or power detection section that could then be utilized to activate a light source within and/or on the circuit breaker box when a power outage has occurred. A removable light source could also be included that can be removed from the circuit breaker box to allow a user to replace a bad circuit breaker and/or work on the circuit breaker box. Other examples could include the power detection circuit and/or removable section to allow for a light source to be utilized by a user.

The connector 638 may be connected with a computing device 657 via an interface 654, with it being understood that the connector interface 654 could be a connection, circuit, and/or a coupling. In at least one example, the computing device may include a connection to the sensor 624, through a sensor interface 665. The computing device 657 can then process information received through the various connection in order to prepare and/or communicate alerts or notifications to a security, emergency, and/or fire prevention system.

Through a communication interface 655, the computing device 657 may be connected to a wireless module 653. A memory unit 653 may also be connected with the computing device 663 through a memory interface 661. In at least one embodiment, the wireless module 653 may feature a WIFI transmitter/receiver, or other wireless transceivers such as Bluetooth®, ZigBee or other low power wireless transmission system that may be able to transmit and receive communications wirelessly. In some examples, the communications may be through digital transmission protocols, while other examples may include analog communication protocols. In some examples wireless module 653, may incorporate a power line communications circuit and/or a wired communication circuit connected to the computing device 657 so that signals may be sent and received by the computing device 657 through wired connection coupled to the electrical outlet device 600.

Communications sent or received by wireless module 653 may be sent to the computing device 657 can be removed from or placed in in a memory unit 663 via the memory interface 661. In at least one embodiment the memory unit 663 can be capable of temporary and/or permeant storage, and/or other forms of computer readable media or medium. Data preloaded in the memory unit 663 may also be retrieved from the memory unit 663 by the computing device 657 to properly transmit/receive data through the wireless module 653 and/or provide processing of data, notification alerts, information, or combinations thereof. The memory unit 663 may also allow for the storage of executable or computer readable code that provide instructions to the computing device 657.

In at least one example, the computing device 657 may activate and/or deactivate the wireless module 653 depending on the status of the removable section 612. If the removable section 612 is disconnected from the first section and/or an external power source is no longer connected to the electrical outlet device 600, then the computing device may direct the wireless module to send a communication via the wireless module 653 indicating that the electrical outlet device 600 may no longer be connected to a power source. The computing device 657 may also be configured to detect that a connection to an external power source is no longer available, and that communication through the wireless module 653 is dependent on power received from the at least one energy storage device 616. The computing device 657 may be configured to prohibit communication through the wireless module 653 if there is a need to conserve power reserves stored in the at least one energy storage device 616.

In at least one example, the computing device 657 may be configured to prioritize communications and direct communication through the wireless module 653 if a communication is determined to be of a higher priority. For instance, the electrical outlet device 600 may not be connected to an external power source and dependent on the at least one energy storage device 616 for power. A smoke detection sensor 624 that is incorporated into the electrical outlet device 600 may make an observation that the airborne pollutants have accumulated in the immediate environment surrounding the electrical outlet device 600 indicating the presence of a nearby fire hazard (not shown). While other communications via the wireless module 653 may be currently prohibited in order to conserve the power reservoir of the at least one energy storage device 616, the computing device 657 may determine that the need to communicate an alert because of the nearby fire hazard is of a higher priority. The computing device 657 may then activate the wireless module 653 and direct that an alert be transmitted.

In at least one embodiment, the sensor 624 may be connected to the computing device 657 through a sensor interface 665. The computing device 657 can be configured to and capable of interfacing with the sensor 624 and analyzing various types of data received from the sensor 624. For example, the sensor 624 may be capable of detecting the presence of harmful smoke, a lack of light, noise levels above or below a threshold, specific chemical signatures, moisture, temperature above or below a threshold, and/or other environmental conditions in the immediate vicinity of the electrical outlet device 600. The sensor 624 may relay this information to the computing device 657 which can analyze the data. The computing device 657 may then retrieve the proper communications protocols or instructions, in at least one example stored in the memory unit 663, and transmitting data and/or instructions through the wireless module 653 over a wireless or wired network (not shown) to a central server or base station (not shown) for further action. In at least one example, the transmission may also be made to a mobile or user device. In some examples, the central server or base station may issue an alarm, alert, and/or notification to a proper entity such as, but not limited to, a fire, police, EMS or other personal, requesting further investigation of the area in the immediate vicinity of the electrical outlet device 600 that sent the signal. Other example may also be able to connect, either directly or indirectly through intermediate networks or device, with an alarm, fire suppression system, and/or emergency alert system (not shown) capable of addressing the situation such as but not limited to, initiating a fire suppression system to extinguish the source of smoke in a timely manner. The computing device 657 may be able to receive data through wired or wireless connection from various types sensors or systems for detection, evaluating, and/or controlling various environmental conditions. The data received and/or analyzed by the computing device 657 may include data received from, but not limited to the following types of sensors: a smoke detector, carbon monoxide detector, light sensor, a photo resistor, a photodiode, a phototransistor, temperature sensor, moisture sensor, sound level sensor, chemical signature sensor; however, the computing device 657 is not limited to analyzing data from these types of sensors and can be configured to receive, analyze and transmit data from any sensor known by one of ordinary skill in the art.

Figure 7:
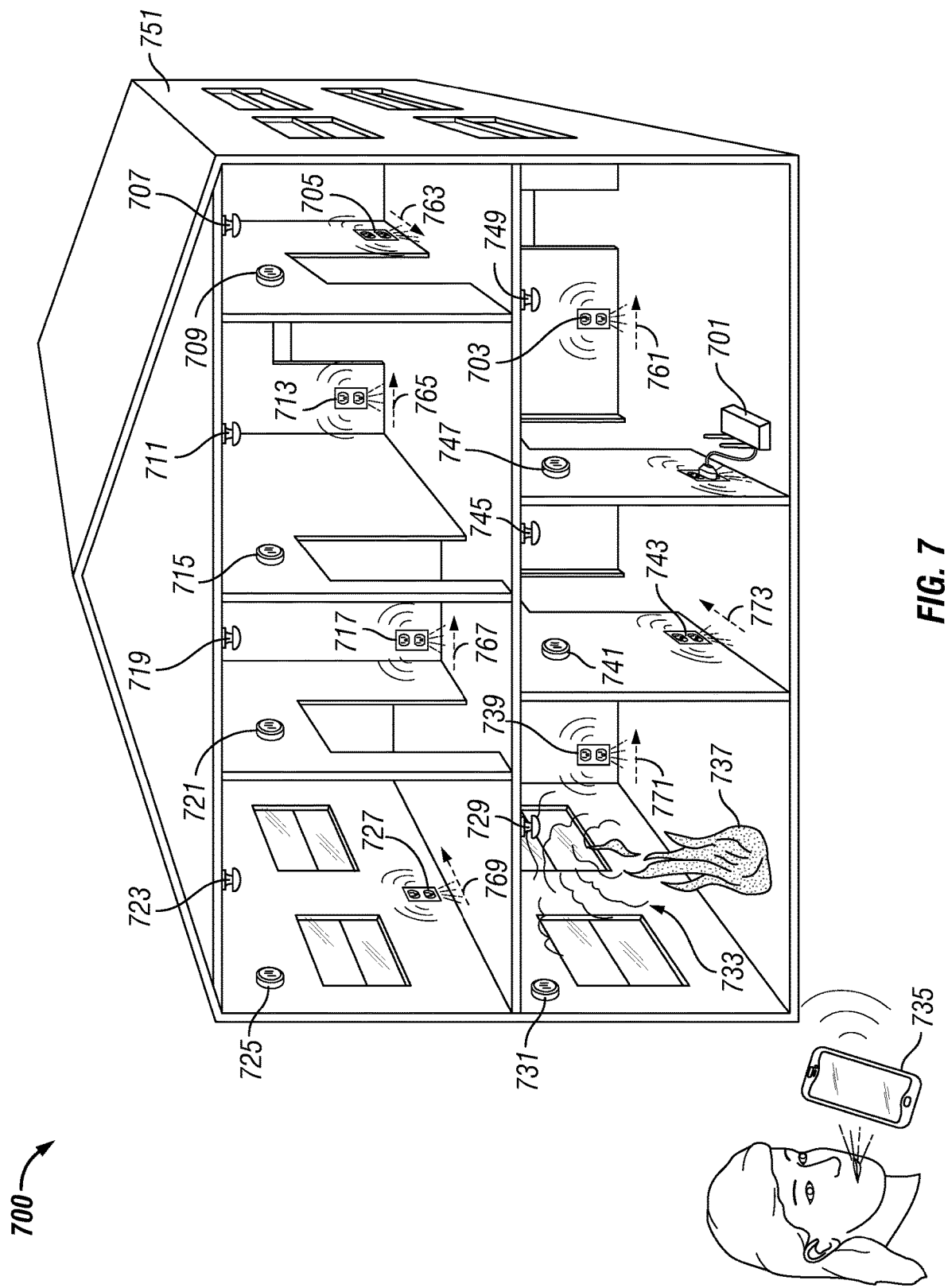
FIG. 7 is an illustration of an environmental view of an electrical outlet device system incorporated into a structure, and each electrical outlet device features a removable section configured with connectivity and with lighting on both sections.

FIG. 7 is an illustration of an environmental view of an electrical outlet device system 700 incorporated into a structure, and each electrical outlet device 703, 705, 713, 717, 727, 739, 743 features a removable section configured with connectivity and with lighting on both sections. An electrical outlet device system 700 can be incorporated into a large structure 751 such as a residence or a commercial building. The placement of each individual electrical outlet device of the electrical outlet device system 700 could depend on the size, shape, and location of a room in the larger structure, as well as the location of doors and exits. By taking into account the dimensions of the various rooms in the large structure 751 and the signal range of each of the individual electrical outlet devices, the entire area, as well as every room, may be covered by an efficient number of individual electrical outlet devices. By placing an electrical outlet device in signal range of at least one other electrical outlet device connected to a network, the electrical outlet device 727 in a large structure 751 may be able to communicate with a base station 701 even if the electrical outlet device 727 is not directly located within range of the base station 701.

In at least one or more embodiment, the electrical outlet device system 700 may include more than one electrical outlet devices 703, 705, 713, 717, 727, 739, 743 that can be connected through a wireless module incorporated within each electrical outlet device 703, 705, 713, 717, 727, 739, 743 with other devices and/or systems for securing, monitoring, and/or alerting persons within the environment of problems or issues. In at least one example, the electrical outlets devices 703, 705, 713, 1517, 727, 739, 743 can comprise a directional indicator or directional projection 761, 763, 765, 767, 769, 771, and/or 773 to indicate a direction to the nearest exit. For example, the electrical outlet devices 703, 705, 713, 717, 727, 739, and/or 743 may have light or ambient light sensors that allow the electrical outlet devices 703, 705, 713, 717, 727, 739, and/or 743 to indicate a direction when the ambient light in room or environment is below a pre-defined threshold, because of smoke, power failure, and/or other environmental conditions.

An electrical outlet device 703, 705, 713, 717, 727, 739, and/or 743 may feature a connectivity component capable of communicating directly and/or through intermediaries with a central hub, central servers, and/or a base station 701. The electrical outlet device(s) 703, 705, 713, 717, 727, 739, and/or 743 may have a sensor incorporated into its structure capable of sensing the presence of and/or change in environmental conditions including but not limited to fire hazards, power outages, gas leaks, water leaks, etc. For example, the electrical outlet device 739 may sense the presence of a fire hazards 737 in its immediate vicinity that is emanating harmful airborne contaminates 733; allowing the electrical outlet device 739 to generate an alert regarding the presence of the fire hazard 737.

Once the environmental change has been detected, the electrical outlet 739 may communicate to other electrical outlet devices 703, 705, 713, 717, 727, 739 and/or 743, as well as a base station 701. In at least one embodiment, the communication from the electrical outlet device 739 may be done via a WIFI network originating from the base station 701. Other examples may feature alternative methods for communication such as Bluetooth, ZigBee, RF signals, IR signals, etc. In response to receiving a communication from the electrical outlet device 739, all or targeted electrical outlet device(s) 703, 705, 713, 717, 727, 739 and/or 743 could respond in a variety of ways. For instance, the other electrical outlet device(s) 703, 705, 713, 717, 727, 739 and/or 743 could activate directional indicator(s) and/or light source(s), and/or Light Emitting Diodes (LEDs) that provide general lighting or visually indicate directions to occupants that may be inside the structure. The additionally lighting could provide necessary instruction to occupants so that they are alerted to the presence of an environmental condition that necessitates action on their part and/or provides directions to properly exit the structure. Other examples of potential responses by the other electrical outlets include but are not limited to emitting audible alarms and/or activating all or designated hazard suppression systems such as water sprinklers 707, 711, 719, 723, 729, 745, and/or 749.

In other examples, the electrical outlet device 739 may communicate directly with a hazard suppression system—for example, the sprinkler head 729 can be in the same room as the electrical outlet device 739—for the suppression of a fire hazard 739 immediately after it has been detected by a sensor incorporated into the electrical outlet device 739. The electrical outlet device 739 may also activate a light source to provide illumination or direction to anyone occupying the same room as the fire hazard 737. An illuminated direction may be necessary for an occupant in the same room as the fire hazard 737 if the room has diminished visibility due to the presence of excessive airborne contaminates 733 emitted by the fire hazard 737.

Each electrical outlet device(s) 703, 705, 713, 717, 727, 739 and/or 743 may incorporate one or more sensors that may be capable making observations that indicate the presence of one or more environmental conditions. In the presences of one or more environmental conditions, an electrical outlet device(s) 703, 705, 713, 717, 727, 739 and/or 743 may be directed to respond accordingly. For instance, an electrical outlet device(s) 703, 705, 713, 717, 727, 739 and/or 743 may incorporate a light sensor, as well as smoke detector. The light sensor may be configured to detect diminished visibility in a room and activate a night light to increase the illumination for an occupant in the room. While the smoke detector may be configured to detect an accumulation of a certain level of airborne pollutants in a room that may have emanated from an ongoing fire hazard and activate a fire alarm after the threshold level of airborne pollutants has been met. As a response to the presence of a certain level of airborne pollutants, a electrical outlet device(s) 703, 705, 713, 717, 727, 739 and/or 743 may also activate an directional indicator(s) or directional projection(s) 761, 763, 765, 767, 769, 771, and/or 773 to provide direction to any occupant in the room to the nearest exit. The electrical outlet device system 700 may incorporate any number of sensors, including sensors of different types, and may be configured to respond based on the observation(s) made by said sensor(s).

In yet another example, the electrical outlet device system 700 may feature connectivity to a device and/or user off site such as the structure owner in possession of a wireless device 735. The electrical outlet device 739 may sense the fire hazard 737 in its immediate vicinity and communicate this fact via the base station 701, directly or through intermediaries such as other electrical outlet devices 703, 705, 713, 717, 727, 739 and/or 743, to the structure owner through the wireless device 735 so that the user may take appropriate action. The electrical outlet device system 700 is not limited to any particular configuration or number of individual outlets in a residential or a commercial structure.

The electrical outlet device system 700 may be utilized as an access point in a larger network. By functioning as an access point, an electrical outlet device 703, 705, 713, 717, 727, 739, and/or 743 in the electrical outlet device system 700 may also allow for data packets to be transmitted and received over the network. One or more electrical outlet devices 703, 705, 713, 717, 727, 739, and/or 743 in the electrical outlet device systems 700 can be incorporated in a large structure 751 and integrated into an existing network so that said network's range is extended. If a wireless device 735 connects with one of the electrical outlet devices 703, 705, 713, 717, 727, 739, and/or 743, that electrical outlet device can function as an access point into the network so that data packets can be transmitted over the network to and from the wireless device. Because the electrical outlet in the electrical outlet device system 700 can be strategically located, each electrical outlets 703, 705, 713, 717, 727, 739, and/or 743 can function as an intermediary for data packets to be transmitted to and received from the next access point in the network, before arriving at its intended destination.

An existing wireless network can be expanded beyond the signal strength of a base station 701. For example, a base station 701, such as a WIFI router may be connected to a modem (not shown) which is configured to connect to the Internet. A device (not shown) may be in a different part of a structure that is too far away from the base station 701 itself to make a proper connection. By connecting the device to at least one electrical outlet device, 703, 705, 713, 717, 727, 739, and/or 743, functioning as an access point, in the electrical outlet device system 700, the device can communicate with the Internet by sending and receiving data packets to one or more of the electrical outlet devices 703, 705, 713, 717, 727, 739, and/or 743 in the electrical outlet device system 700. The individual electrical outlet devices 703, 705, 713, 717, 727, 739, and/or 743, functioning as an intermediary, relay data to another access points in the network, until the data packet reaches the WIFI router 701 and then the modem connected to the Internet. This way, the connected device could have access to necessary emergency services available over the Internet and/or send and receive ordinary web communications.

In at least one example, the portion of the electrical outlet devices 703, 705, 713, 717, 727, 739, and/or 743 may incorporate a computing device (not shown) connected to the wireless module (not shown). The electrical outlet devices 703, 705, 713, 717, 727, 739, and/or 743 may also incorporate an the internal or battery power sources that can be activated to provide power to the light source(s), plug(s), and/or USB outlet(s) in a scenario in which one or all of the electrical outlet devices 703, 705, 713, 717, 727, 739, and/or 743 may become disconnected from an external power source. Each electrical outlet devices 703, 705, 713, 717, 727, 739, and/or 743 may be configured such that the functionality of at least one of the electrical outlet devices 703, 705, 713, 717, 727, 739, and/or 743 is limited because at least one of the electrical outlet devices 703, 705, 713, 717, 727, 739, and/or 743 are no longer connected to an external power supply. If the external power source is disconnected from one or more of the electrical outlet devices 703, 705, 713, 717, 727, 739, and/or 743, the internal computing device may be configured to prohibit or diminish all or some of capabilities of the connected light source(s), plug(s), and/or USB outlet(s) that are being powered by the internal or battery power sources.

For example, an electrical outlet 739 may be disconnected from the external power source and now reliant on the internal power source or battery power for all operations. Because the electrical outlet device 739 may be configured to conserve power, communications via the wireless module (not shown) may be prohibited except in high priority scenarios. If the electrical outlet device 739 is positioned in a room with an ongoing fire hazard 737, an internal smoke detecting sensor (not shown) may make an observation of the amount of harmful airborne pollutants that crosses a certain threshold, triggering the necessity of communication an alarm to the other electrical outlet devices 703, 705, 713, 717, 727, and/or 743 and/or emergency services. Despite the electrical outlet device 739 being disconnected from an external power source and configured to conserve power, the incorporated computing device may determine that communication of the alarm is of higher priority and direct communication of the alarm through the wireless module.

The present disclosure may include a computing device that can include any of an application specific integrated circuit (ASIC), a microprocessor, a microcontroller, a digital signal processor (DSP), a field-programmable gate array (FPGA), or equivalent discrete or integrated logic circuitry. In some examples, the system may include multiple components, such as any combination of one or more microprocessors, one or more microcontrollers, one or more DSPs, one or more ASICs, or one or more FPGAs. It would also be understood that multiples of the circuits, processors, or controllers could be used in combination or in tandem, or multithreading. Additionally, it would be understood that a browser or program could be implemented on a mobile device or mobile computing device, such as, a phone, a mobile phone, a cell phone, a tablet, a laptop, a mobile computer, a personal digital assistant ("PDA"), a processor, a microprocessor, a micro controller, or other devices or electronic systems capable of connecting to a user interface and/or display system. A mobile computing device or mobile device may also operate on or in the same manner as the computing device disclosed herein or be based on improvements thereof.

The components of the present disclosure may include any discrete and/or integrated electronic circuit components that implement analog and/or digital circuits capable of producing the functions attributed to the modules herein. For example, the components may include analog circuits, e.g., amplification circuits, filtering circuits, and/or other signal conditioning circuits. The components may also include digital circuits, e.g., combinational or sequential logic circuits, memory devices, etc. Furthermore, the modules may comprise memory that may include computer-readable instructions that, when executed cause the modules to perform various functions attributed to the modules herein.

Memory may include any volatile, non-volatile, magnetic, or electrical media, such as a random access memory (RAM), dynamic random access memory (DRAM), static random access memory (SRAM), read-only memory (ROM), non-volatile RAM (NVRAM), electrically-erasable programmable ROM (EEPROM), flash memory, hard disks, or any other digital media. Additionally, there may also be a tangible non-transitory computer readable medium that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of a computing device. It would be understood that the tangible non-transitory computer readable medium could also be considered a form of memory or storage media.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A network access point, comprising:
   (a) a main body with at least one removable section;
   (b) at least one energy storage device coupled to the at least one removable section;
   (c) a first light source coupled to the main body;
   (d) a second light source coupled to the at least one removable section;
   (e) a sensor configured to activate the first light source through a control circuit;
   (f) a first switch coupled to the control circuit to control an operational mode of the control circuit;
   (g) at least one USB outlet with an opening defined in the main body or removable section;
   (h) at least one computing device coupled with the at least one removable section; and
   (i) a wireless module coupled with the at least one computing device, wherein the wireless module is configured to transmit/receive wireless data packets.

2. The network access point of claim 1, further comprising at least one circuit breaker coupled to a power source.

3. The network access point of claim 1, further comprising at least one electrical plug coupled to a power source.

4. The network access point of claim 1, wherein the at least one USB outlet is coupled to the at least one energy storage device.

5. The network access point of claim 1, wherein the at least one energy storage device comprises a battery.

6. The network access point of claim 1, further comprising a modem housed within the main body and electrically coupled to the network access point.

7. The network access point of claim 1, wherein the sensor is a photoresistor.

8. The network access point of claim 1, wherein the sensor is a photodiode.

9. The network access point of claim 1, further comprising a second switch for controlling an output of the first light source or the second light source.

10. An electric device comprising:
    (a) an enclosure having a main body and at least one removable section;
    (b) at least one energy storage device for storing energy;
    (c) a first light source for providing light from the main body;
    (d) a second light source coupled to one or more of the at least one energy storage device and providing light from the at least one removable section;
    (e) a sensor coupled to a control circuit configured to provide a control signal based on an environmental condition;
    (f) a first switch coupled to the control circuit to control at least one operational mode of the control circuit;
    (g) at least one USB outlet coupled to one or more of the at least one energy storage device or a power source;
    (h) at least one computing device coupled with the at least one removable section; and
    (i) a wireless module coupled with the at least one computing device, wherein the wireless module is configured to transmit/receive wireless data packets.

11. The electric device of claim 10, further comprising a second switch for controlling an output of the first or second light source.

12. The electric device of claim 10, wherein the electrical device is a network access point or modem.

13. The electric device of claim 10, further comprising an electrical plug to electrically couple the electrical device with a power source.

14. The electric device of claim 10, wherein the electrical device is a portable speaker.

15. The electric device of claim 10, wherein the first light source is selectively coupled to one or more of the at least one energy storage device.

16. The electric device of claim 10, wherein the at least one removable section further comprises a USB removable section having an energy storage device.

17. The electric device of claim 10, wherein the at least one removable section further comprises a removable light section having an energy storage device.

18. The electric device of claim 10, wherein the at least one energy storage device comprises a battery.

19. The electric device of claim 10, wherein the electrical device further comprises at least one speaker.

20. The electric device of claim 10, wherein the sensor is a photodiode or photoresistor.

* * * * *